United States Patent [19]

Fukazawa et al.

[11] Patent Number: 5,097,372
[45] Date of Patent: Mar. 17, 1992

[54] THIN FILM MAGNETIC HEAD WITH WIDE RECORDING AREA AND NARROW REPRODUCING AREA

[75] Inventors: Toshio Fukazawa, Kyoto; Yuji Nagata, Yao, both of Japan

[73] Assignee: Matsushita Electric Industrial Co., Ltd., Osaka, Japan

[21] Appl. No.: 559,067

[22] Filed: Jul. 30, 1990

[30] Foreign Application Priority Data

Aug. 4, 1989 [JP] Japan ................. 1-203258
Aug. 4, 1989 [JP] Japan ................. 1-203259

[51] Int. Cl.$^5$ ........................................ G11B 5/127
[52] U.S. Cl. .......................... 360/113; 360/126; 360/119; 360/110; /
[58] Field of Search ............ 360/113, 110, 126, 119, 360/122, 127

[56] References Cited

U.S. PATENT DOCUMENTS

| 4,566,050 | 1/1986 | Beam et al. | 360/113 |
| 4,635,227 | 1/1987 | Normann | 360/122 |
| 4,789,910 | 12/1988 | Otsuka et al. | 360/113 |
| 4,802,043 | 1/1989 | Sato et al. | 360/113 |
| 4,816,947 | 3/1989 | Vinal et al. | 360/113 |
| 4,881,143 | 11/1989 | Bhattacharyya et al. | 360/113 |
| 4,885,649 | 12/1989 | Das | 360/113 |
| 4,935,832 | 6/1990 | Das et al. | 360/113 |
| 4,954,920 | 9/1990 | Yamada et al. | 360/113 |

FOREIGN PATENT DOCUMENTS

| 60-50612 | 3/1985 | Japan | 360/113 |
| 61-196418 | 8/1986 | Japan | 360/113 |
| 61-276110 | 12/1986 | Japan | 360/113 |
| 62-43813 | 2/1987 | Japan | 360/113 |
| 62-92215 | 4/1987 | Japan | 360/113 |
| 62-92218 | 4/1987 | Japan | 360/113 |
| 1-138608 | 5/1989 | Japan | 360/113 |
| 1-307008 | 12/1989 | Japan | 360/113 |
| 2-105307 | 4/1990 | Japan | 360/113 |
| 8807741 | 10/1988 | PCT Int'l Appl. | 360/113 |

*Primary Examiner*—Aristotelis Psitos
*Assistant Examiner*—Alfonso Garcia
*Attorney, Agent, or Firm*—Stevens, Davis, Miller & Mosher

[57] ABSTRACT

A thin film magnetic head includes an upper magnetic layer comprising a first yoke, a portion of which is divided into front and rear sections and which is provided near the divided sections with a magneto-resistive element, a second yoke provided adjacent to the opposite ends of the first yoke in a widthwise direction of a recording track and a third yoke provided between the first yoke and the second yoke and having a larger magnetic reluctance than those of the first and second yokes. In the above constitution, the first, second and third yokes can be mainly used in recording to record in an area of a large width on the recording medium, and only the first yoke can be used in reproducing to reproduce in an area of a small width on the recording medium, so that the reproducing output is not reduced when the recording medium experiences a running deviation.

6 Claims, 4 Drawing Sheets

F I G. 2
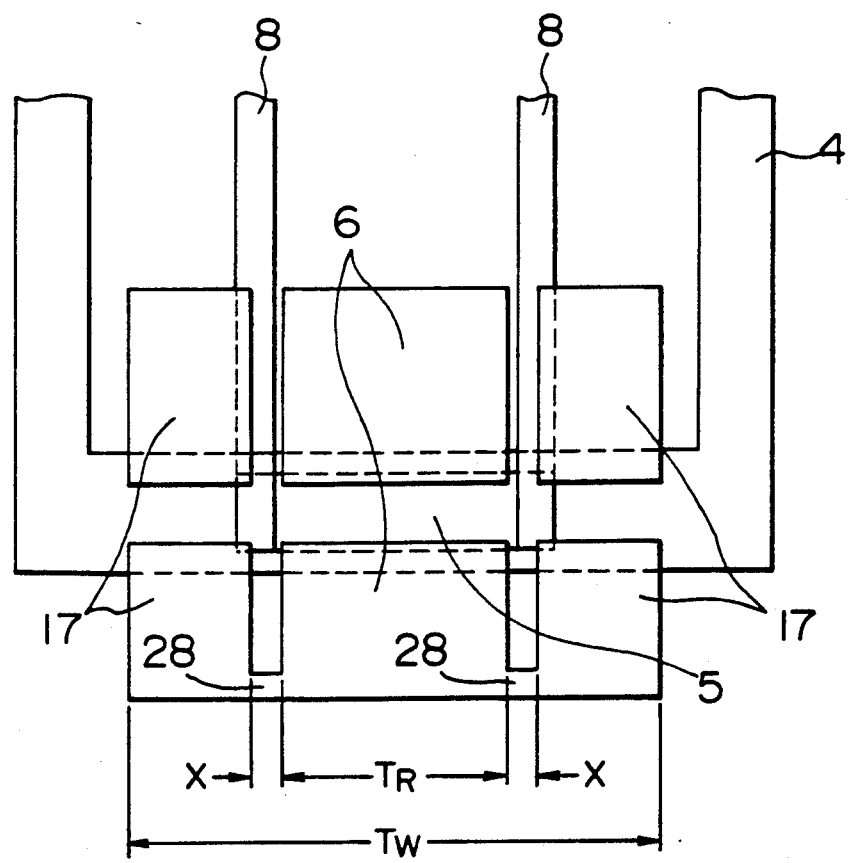

THIN FILM MAGNETIC HEAD WITH WIDE RECORDING AREA AND NARROW REPRODUCING AREA

BACKGROUND OF THE INVENTION

1. Field of the Invention

The present invention relates to a thin film magnetic head for use with magnetic recording systems, and, more particularly, to a thin film magnetic head in which a recording head and a reproducing head are formed integrally with each other.

2. Description of the Prior Art

A prior inductive head produces a reproducing output proportional to running speeds of a recording medium.

On the other hand, a thin film magnetic head using the magnetoresistance effect is not dependent upon a relative speed between the head and a recording medium and produces a constant reproducing output such that the output is not reduced even when such relative speed is small. Accordingly, thin type of film magnetic head has been widely used with magnetic recording apparatuses in recent years. However, since such thin film magnetoresistive head is not capable of recording, they must be combined with an inductive thin film head of coil type in order to provide both recording and reproducing functions. An example of such this type of thin film magnetic head is disclosed in Japanese Patent Unexamined Publication Nos. 52-12814 and 61-48116.

In a prior thin film magnetic head, lower and upper magnetic layers are linearly extended in opposed relationship with each other on a substrate, and these magnetic layers and a magnetic gap formed therebetween constitute a magnetic circuit. In addition, a coil layer is formed around the magnetic circuit. The upper magnetic layer is divided into front and rear sections, and a magnetoresistive element is arranged to bridge these sections.

This thin film magnetic head acts in the manner described hereinbelow. In recording, a recording current flows through the coil layer, so that a recording magnetic field leaks to the outside through the magnetic gap, with writing on a recording medium being performed by the thus leaking magnetic field.

In reproducing, a signal magnetic flux generated from the recorded medium passes through the magnetic gap and the front section of the upper magnetic layer to flow into the magnetoresistive element. The signal is detected from the resistance change of the magnetoresistive element. More specifically, a sense current is applied to the magnetoresistive element and the resistance change of the element is transformed into a voltage change such that the signal is read out.

However, such prior thin film magnetic head can not provide favorable recording and reproducing where the recording medium does not have good running accuracy because the track width is the same in recording and reproducing. More specifically, assuming that the prior thin film magnetic head has a recording and reproducing track width $T_1$ and the recording medium has a running accuracy of a, the maximum running deviation in recording and reproducing will become $2a$ and the effective reproducing track width will become $T_1 - 2a$, which means reduction in the reproducing output.

SUMMARY OF THE INVENTION

It is an object of the invention to solve the problems in the prior art and to provide a thin film magnetic head capable of performing favorable magnetic recording and reproducing.

To this end, the invention provides a thin film magnetic head in which an upper magnetic layer comprises a first yoke having a portion thereof substituted by a magnetoresistive element and a second yoke provided adjacent the first yoke, said first and second yokes defining a recording track width.

In the above constitution of the invention, the first and second yokes can be mainly used to wide-record on the recording medium, and only the first yoke can be used to narrow-reproduce on the recording medium, so that the reproducing output is not reduced when the recording medium experiences a running deviation.

BRIEF DESCRIPTION OF THE DRAWINGS

FIG. 2 is a plan view of a thin film magnetic head according to a second embodiment of the invention;

DESCRIPTION OF THE PREFERRED EMBODIMENTS

Figure 1A:
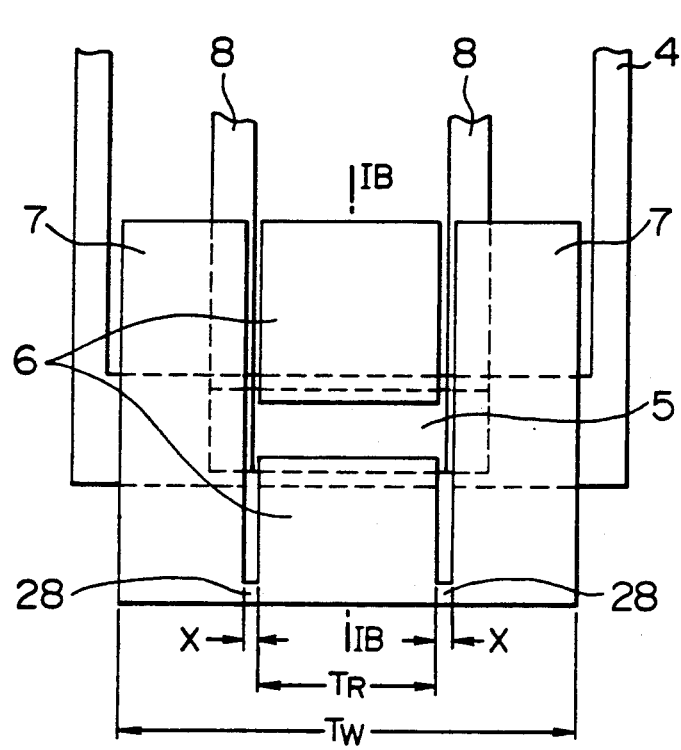
FIG. 1A is a plan view of a thin film magnetic head according to a first preferred embodiment of the invention.
Figure 1B:
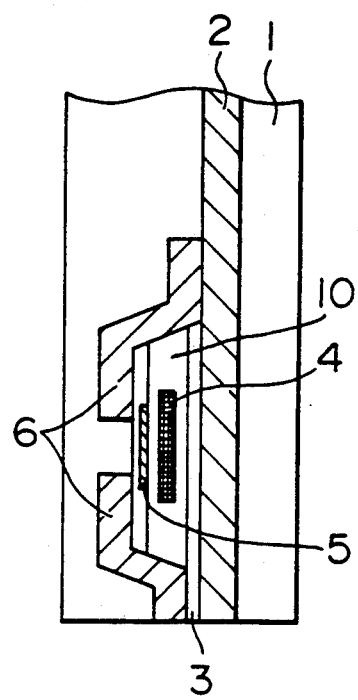
FIG. 1B is a cross-sectional view taken along the line IB—IB of FIG. 1A.
Figure 1C:
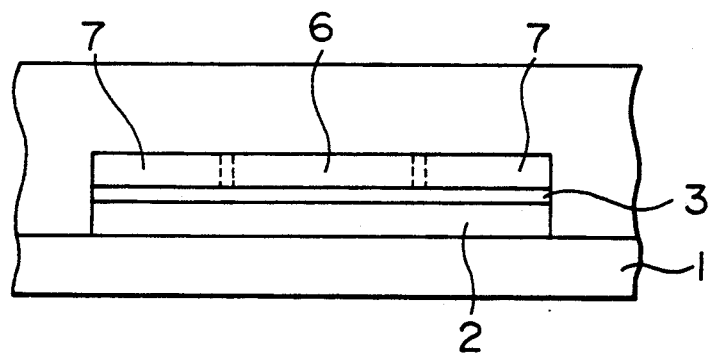
FIG. 1C is a front view of the thin film magnetic head of FIG. 1A as viewed from a sliding surface of a recording medium.

As shown in FIGS. 1A to 1C, a thin film magnetic head according to a first embodiment of the invention includes a nonmagnetic substrate 1 made of ceramics, glass or the like, a lower magnetic layer 2 formed of a soft magnetic material such as permalloy, sendust or the like by sputtering process and provided on the nonmagnetic substrate 1 to have the same width as that of a recording track, a gap layer 21 including gaps 3,13,13',23,23' made of an insulating material ($SiO_2$) and provided on the lower magnetic layer 2, a conductor coil 4 formed in an insulating layer 10, a magnetoresistive element 5 made of a nickel-iron alloy and provided on the insulating layer 10, and first and second yokes 6 and 7, 7' each made from permalloy or sendust by sputtering and divided into front and rear sections. The first yoke 6, magnetoresistive element 5, gap 3 and the lower magnetic layer 2 cooperate to form a magnetic circuit which surrounds the conductor coil 4. The second yoke 7, 7' is arranged at positions spaced by a distance X in the widthwise direction of the track. Provided contiguous to the first and second yokes is a third yoke 28, 28' which is positioned therebetween so as to be contacted by the recording medium 25 and has a larger magnetic reluctance than those of the first and second yokes 6 and 7, 7'. Like the first yoke, the second and third yokes cooperate with the gaps 13, 13', 23, 23' and the lower magnetic layer 2 to form a magnetic circuit which surrounds the conductor coil 4. Furthermore, at the opposite ends of the magnetoresistive element 5 are provided electrodes 8 as electric supply means for reproducing only a signal magnetic field which is generated from the recording medium 25 by the first yoke 6.

In operation, a recording current is applied to the conductor coil 4, and the induced magnetic field for recording is generated to the gap 3 through the magnetic circuit comprising the first yoke 6 and the lower magnetic layer 2 and is generated to gaps 13, 13' through the magnetic circuit comprising the second yoke 7, 7' and the lower magnetic layer 2 so that recording is effected on the recording medium 25. Simultaneously, the magnetic field for recording flows into the third yoke 28, 28' and an induced magnetic field is generated in gaps 23, 23'. As a result, the width Tw of the recording track is the sum of the widths of the first, second and third yokes.

In reproducing, the magnetic field from the recording medium 25 is conducted mainly through the first and second yokes 6 and 7,7'. Signals are detected through a change in resistance of magnetoresistive element 5. More specifically, drive current is applied to magnetoresistive element 5 by means of electrodes 8,8' to convert the change in resistance of the magnetoresistive element into a change in electrical voltage for reading of signals. Since the third yoke 28,28' is provided between the first and second yokes 6 and 7,7' and the magnetic reluctance of the third yoke 28,28' is larger than those of the first and second yokes, the magnetic field conducted through the second yoke 7,7' will not flow into the magnetoresistive element 5, so that the width of the first yoke 6 substantially defines the width of the reproducing track.

The thin film magnetic head is constructed such that the recording track width Tw and the reproducing track width Tr make $Tw \geq Tr + 2a$ (where a is the deviation of the recording medium from a desired travel path during operation), so that even when the running deviation of the recording medium becomes 2a at maximum in recording and reproducing, the reproducing track is included within the recording track to prevent the reproducing signal output from being lowered.

Furthermore, when the second yoke 7,7' enters into an adjacent track due to a running deviation of the recording medium, the signal magnetic field in the adjacent track flows into the yoke 7,7' but will not flow into the magnetoresistive element 5 since the third yoke 28,28', is provided between the second yoke 7,7' and the first yoke 6 and has a larger magnetic reluctance than those of the first and second yokes. Accordingly, good reproduction with little cross talk can be obtained.

With reference to FIG. 2, a second embodiment of the invention will be described hereinbelow. In FIG. 2, the same parts as those shown in FIGS. 1A to 1C are designated by the same reference numerals, and the explanation thereof is omitted. The second embodiment is different from the first embodiment in that a second yoke 17,17' is divided into front and rear sections, like a first yoke 6. As the result, the magnetic circuit comprising the lower magnetic layer 2 and the first yoke 6 and the magnetic circuit comprising the lower magnetic layer 2 and the second yoke 17,17' are substantially identical to each other in constitution. Thus, in recording, a magnetic field generated by applying a recording current to the conductor coil 4 passes through the magnetic circuit comprising the lower magnetic layer 2 and the first yoke 6 and the magnetic circuit comprising the lower magnetic layer 2 and the second yoke 7,7' to reach the respective magnetic gaps, thus generating recording magnetic fields of substantially the same strength. Accordingly, dispersion in the quality of recording over the recording medium is reduced. To improve such effect, dummy magnetoresistive elements may be provided on the divided sections of the second yoke 17,17'.

Figure 3A:
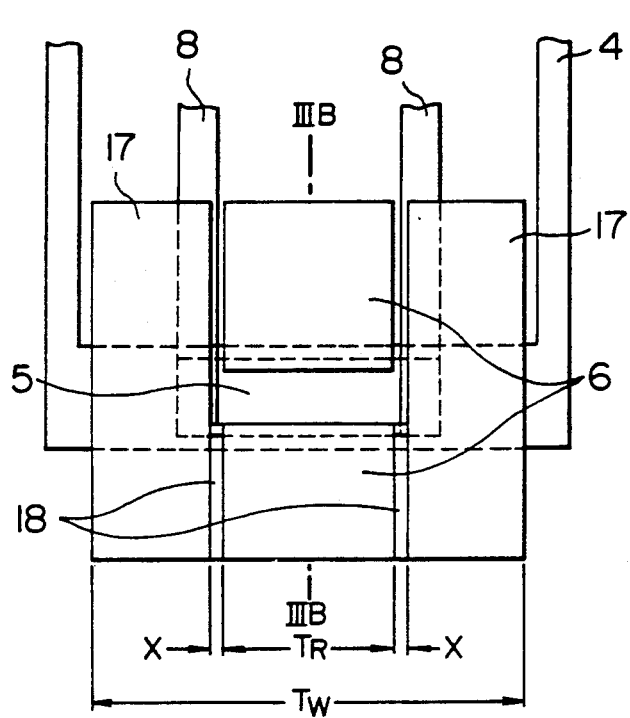
FIG. 3A is a plan view of a thin film magnetic head according to a third embodiment of the invention.
Figure 3B:
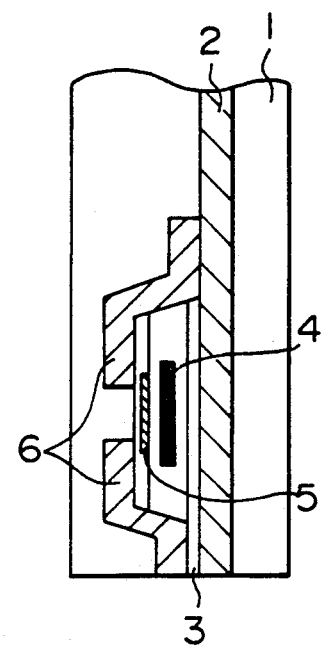
FIG. 3B is a cross-sectional view taken along the line IIIB—IIIB of FIG. 3A.
Figure 3C:
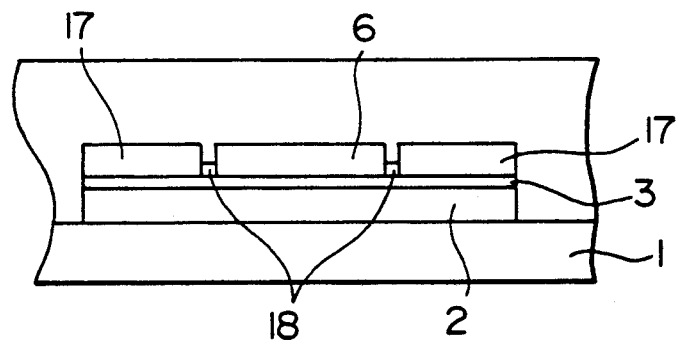
FIG. 3C is a front view of the thin film magnetic head of FIG. 3A as viewed from a sliding surface of a recording medium.

FIGS. 3A to 3C show a third embodiment of the invention. In FIGS. 3A to 3C, the same parts as those of the first and second embodiments are designated by the same reference numerals.

In the third embodiment, a third yoke 18,18' is formed to have a thinner film thickness and a larger magnetic reluctance than those of the first yoke 6 and the second yoke 17,17'. The third embodiment operates in substantially the same manner as the first and second embodiments, thus providing substantially the same effect as that of the preceding embodiments.

Figure 4:
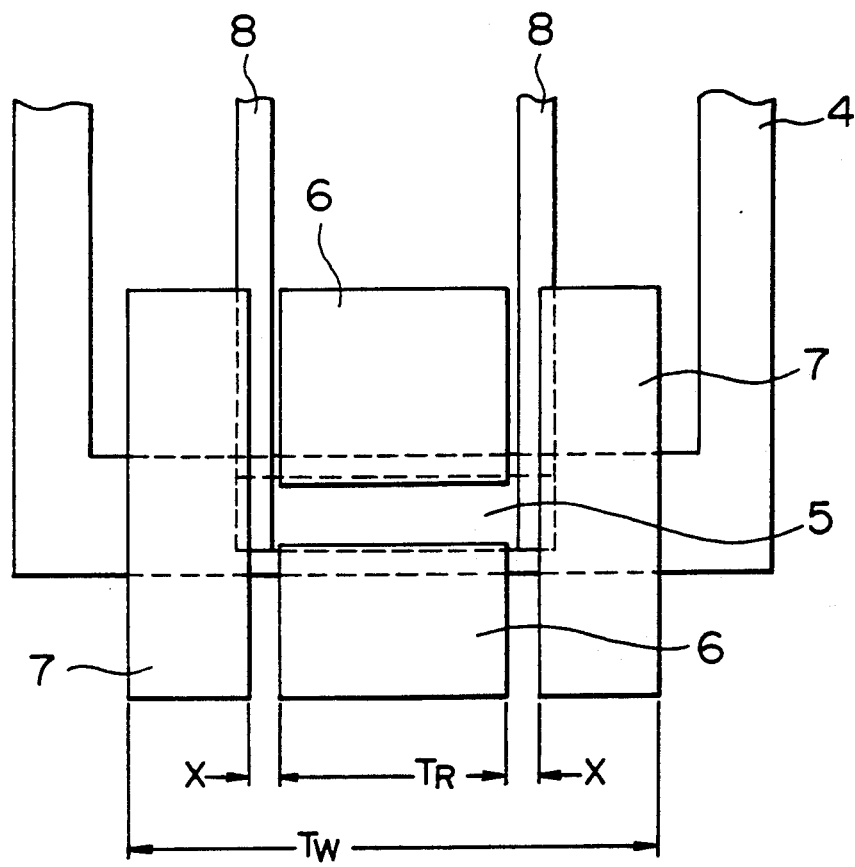
FIG. 4 is a plan view of a thin film magnetic head according to a fourth embodiment of the invention.

FIG. 4 shows a plan view of a thin film magnetic head according to a fourth embodiment of the invention, in which the second yoke 7,7' is arranged at the positions laterally spaced by a distance X from the opposite ends of the first yoke 6. Accordingly, the recording track width Tw is the sum of the widths of the first yoke 6, second yoke 7 and the distances X (to yield air gaps 30,30',40,40'); of the air gaps 30, 30',40,40' between the first yoke 6 and the second yoke 7. The width of the reproducing track corresponds to the width $T_R$ of the first yoke 6.

In this embodiment, portions of the recording track corresponding with the air gaps 30,40 are a non-recording condition, so that the width of the effective reproducing track is represented by the equation $T_R' = T_R - X$ when the recording medium experiences running deviations. However, if the distance X of the air gaps is sufficiently small as compared with the width TR of the first yoke 6, the reproducing output is little affected by such running deviations. Accordingly, favorable recording and reproducing can be effected. In the third and fourth embodiments, the second yoke 7,7' may be divided into front and rear sections in a similar manner to the second embodiment.

Although the recording track width is defined with the upper and lower magnetic layers set at the same width in all of the embodiments, the upper and lower magnetic layers having different widths to provide a magnetic layer of a small width may define the width of the recording track.

Furthermore, it is possible that in reproducing an electric current passes through the conductor coil 4 to apply a bias magnetic field to the magnetoresistive element 5, thereby improving the reproducing sensitivity.

What is claimed is:

1. In a thin film magnetic head including a lower magnetic layer formed on a substrate, magnetic gaps provided by non-magnetic layers, an upper magnetic layer, a magnetoresistive element having electrodes for electric current supply provided below the upper magnetic layer, and a coil layer wound around a magnetic circuit comprising the lower and upper magnetic layers and the magnetic gaps, the improvement wherein said upper magnetic layer comprises a first yoke which is divided into a front section and a rear section and is disposed adjacent to said magnetoresistive element, a second yoke provided adjacent to ends of said first yoke in a widthwise direction of said first yoke and a third yoke provided between said first yoke and said second yoke and having a larger magnetic reluctance than that of said first yoke and said second yoke and wherein a reproducing track width is defined by the width of said first yoke and a recording track width is defined by the widths of said first, second and third yokes.

2. A thin film magnetic head as set forth in claim 1, wherein said magnetoresistive element is disposed adjacent to the divided front and rear sections of said first yoke.

3. A thin film magnetic head as set forth in claim 1, wherein said second yoke is divided into front and rear sections at positions corresponding to the divided front and rear sections of said first yoke.

4. A thin film magnetic head as set forth in claim 1, wherein said third yoke is formed between said first and second yokes adjacent to said magnetic gaps and has a smaller thickness tan those of said first and second yokes.

5. A thin film magnetic head as set forth in claim 2, wherein said second yoke is divided into front and rear sections at positions corresponding to the divided front and rear sections of said first yoke.

6. In a thin film magnetic head including a lower magnetic layer formed on a substrate, magnetic gaps provided by non-magnetic layers, an upper magnetic layer, a magnetoresistive element having electrodes for electric current supply provided below the upper magnetic layer, and a coil layer wound around a magnetic circuit comprising the lower and upper magnetic layers and the magnetic gaps, the improvement wherein said upper magnetic layer comprises a fist yoke which is divided into a front section and a rear section and is disposed adjacent to said magnetoresistive element and a second yoke provided adjacent to ends of said first yoke in a widthwise direction of said first yoke with predetermined air gaps therebetween, and wherein a reproducing track width is defined by the width of said first yoke and a recording track width is defined by the sum total of the widths of said first and second yokes and said air gaps.

* * * * *